United States Patent [19]

Harant

[11] 4,177,678
[45] Dec. 11, 1979

[54] DRIVE FOR BALANCING MACHINES

[75] Inventor: Gerhart W. Harant, Blackburn, Australia

[73] Assignee: Repco Limited, Australia

[21] Appl. No.: 911,043

[22] Filed: May 30, 1978

[30] Foreign Application Priority Data

Jun. 7, 1977 [AU] Australia .............................. PD0375

[51] Int. Cl.² .............................................. G01M 1/16
[52] U.S. Cl. ........................................ 73/460; 73/487
[58] Field of Search .................. 73/460, 459, 462–466, 73/487

[56] References Cited

U.S. PATENT DOCUMENTS

| 3,140,616 | 7/1964 | Hack | 73/460 |
| 3,152,482 | 10/1964 | Federn | 73/460 |

Primary Examiner—James J. Gill
Attorney, Agent, or Firm—Watson, Cole, Grindle & Watson

[57] ABSTRACT

The invention relates to machines which determine the unbalance in a workpiece by rotating the workpiece and measuring the unbalance forces reacted into the machine frame. A drive arrangement is disclosed for rotating a spindle supporting the workpiece in such a machine for balancing vehicle wheels. The arrangement comprises a spindle housing for rotatably supporting the spindle and mounted on a base frame in a manner whereby the forces are reacted into a single direction and measured. The invention resides in the drive arrangement which includes speed changing means in the form of a worm gear on the spindle and a worm drive mounted on the spindle housing. A drive motor for driving the worm is mounted on the machine frame, that is, away from the spindle housing and drives the worm by means of a belt drive between a motor pulley and a pulley connected to the worm. The arrangement disclosed provides optimum isolation of forces occurring in the motor and drive and the speed changing means ensures that any spurious cyclical forces reacted into the single direction occur at a substantially different frequency to those being measured and are thus easily isolated electrically.

4 Claims, 3 Drawing Figures

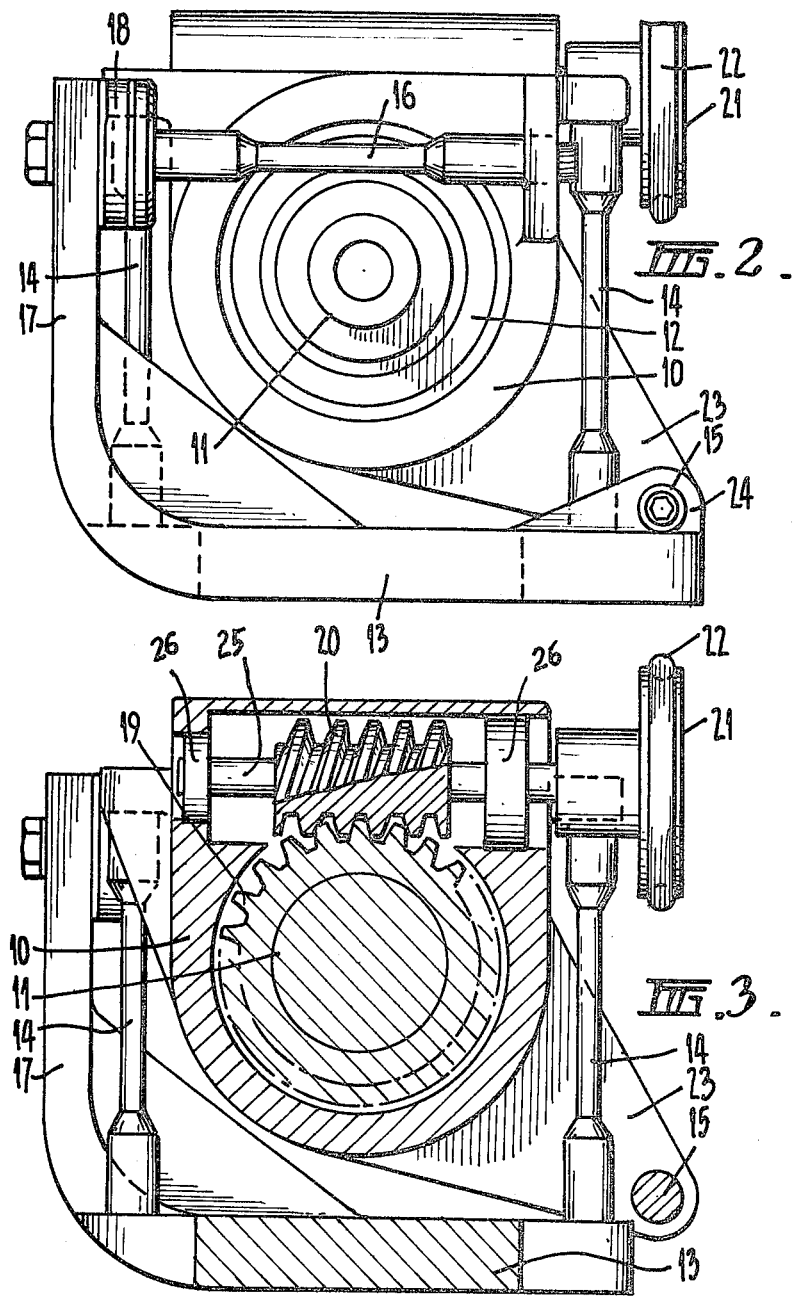

DRIVE FOR BALANCING MACHINES

BACKGROUND

1. Field of the Invention

This invention relates to machines which determine the unbalance in a workpiece by rotating the workpiece and by measuring either the forces reacted into the machine frame via force transducers (hard bearing machines) or by measuring the deflection of the workpiece supporting members (soft bearing machines). In particular the invention relates to an apparatus for driving (rotating) the workpiece in a hard bearing machine.

2. Prior Art

One of the major difficulties in the construction of such machines is the isolation of forces generated in the driving system from the unbalance forces to be measured. It will be appreciated that any force applied in the direction of measurement and repeating cyclically with the rotation of the workpiece will register as an unbalance in the workpiece. Cyclical forces occurring at frequencies which are of the same order as the running frequency although not phase related will generate signals from which the wanted signal can be isolated but only by use of sophisticated techniques.

Noise or unwanted signals occurring at frequencies much higher than the running speed are relatively easy to discrimate against electrically; however there is a limit to the amplitude of such disturbing signals which can be handled without overloading a pre-amplifier or signal conditioner which has to cope with the total signal.

The requirements for the drive of a balancing machine are therefore twofold:

Firstly: that the overall amount of disturbing signal in the direction of measurement be kept low and Secondly: that the disburbing signals should contain only a minimal proportion of signals occurring at or around the rotational frequency.

The quality of isolation of signal forces from driving forces is therefore of paramount importance in the design of sensitive balancing machines for accurate work. However, it will be seen that conversely, if a simple driving system can be built which creates effective isolation, balancing machines for rigid rotors can be built to run at lower speeds, which has obvious advantages.

SUMMARY OF THE INVENTION

It is one object of this invention to create driving means for balancing machines which fulfil the requirements of good isolation and at the same time may be used, if desired, to drive rotors at relatively low speeds.

The invention therefore provides an apparatus for rotating a workpiece to be balanced in a balancing machine of the kind having a spindle for supporting said workpiece for rotation, said spindle being rotatably supported on a spindle mounting frame arranged to enable out of balance forces to be resolved into a single direction and measured, said single direction being at right angles to the axis of said spindle, wherein said apparatus comprises a speed reduction means mounted on said frame to transmit drive to said spindle, said speed reduction means rotating at a speed significantly greater than the rotational speed of said spindle and being driven by drive means from a drive motor mounted away from said frame in a manner whereby any cyclical force changes occurring in said drive means and spuriously reacted into said direction occur at a frequency substantially different to the frequency of signals resulting from out of balance forces in said workpiece.

In another aspect the invention provides an apparatus for rotating a workpiece to be balanced in a balancing machine of the kind having a spindle for supporting said workpiece for rotation, said spindle being rotatably supported on a spindle mounting frame arranged to enable out of balance forces to be resolved into a single direction and measured, said single direction being at right angles to the axis of said spindle, wherein said apparatus comprises a speed reduction means mounted on said frame to transmit drive to said spindle, said speed reduction means rotating at a speed significantly greater than the rotational speed of said spindle and being driven by drive means from a drive motor mounted on said spindle mounting frame with its axis in said direction in a manner whereby any cyclical force changes occurring in said drive means or any vibrations occurring due to unbalance in said motor and spuriously reacted into said direction occur at a frequency substantially different to the frequency of signals resulting from out of balance force in said workpiece.

The invention applies primarily, but not by any means exclusively, to machines which have a driven spindle reacted at one or two points, and a workpiece cantilever mounted beyond the spindle bearings. This construction is typical of vertical balancing machines and machines for the balancing of motor vehicle wheels.

The following description will apply to a dynamic vehicle wheel balancer with horizontal spindle and force transducers, but may easily be interpreted to apply to other systems.

In such a spindle support, means must be used to ensure that only the forces acting in the direction of the transducers are registered at the transducers. Such support means must be constructed so that vertical forces or forces acting along the axis of the spindle do not produce reactions in the transducers. One such support means is the subject of an earlier patent application in Australia and elsewhere by the present applicant and is described briefly with reference to the accompany drawings.

In the drawings:

BRIEF DESCRIPTION OF THE DRAWINGS

FIG. 2 is an end view in the direction of the arrows 2—2 of FIG. 1, and FIG. 3 is a sectional view taken along the line 3—3 of FIG. 2.

DETAILED DESCRIPTION

Figure 1:
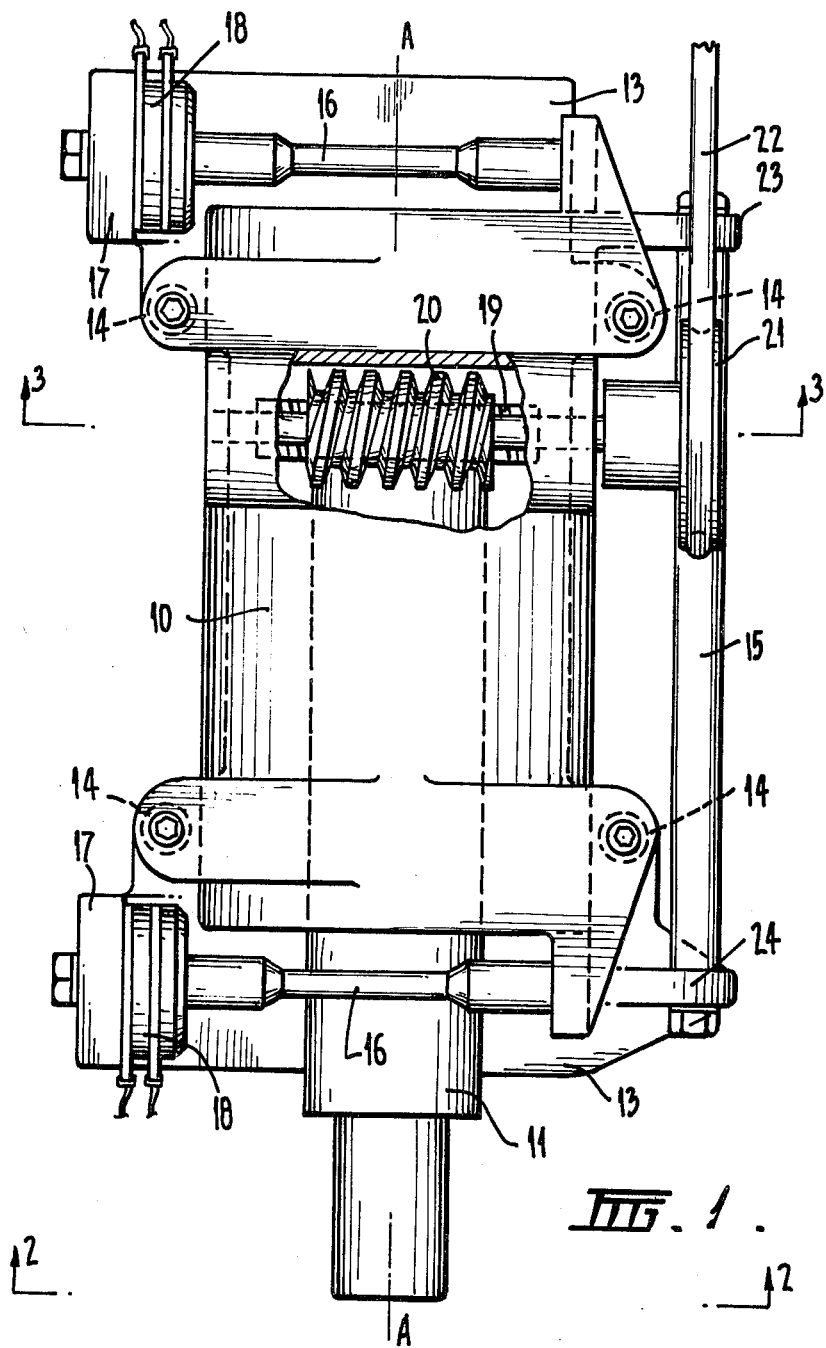
FIG. 1 is a plan view of an apparatus according to one particular embodiment of the invention showing part of the casing broken away.

Referring now to the drawings the spindle support is shown to comprise a spindle housing 10 for supporting a spindle 11 to which a workpiece (not shown) is attached in order to be balanced by the apparatus. The workpiece in this case is a vehicle wheel which is attached to the cantilevered end of the spindle 11 shown in FIG. 1. The spindle has attachment means (not shown) for the purpose of holding the wheel thereon. Bearings 12 adjacent each end of the housing 10 rotatably support the spindle 11.

The housing 10 according to the embodiment fully encloses the spindle 11 except for the projecting cantilevered end but in an alternative form the housing merely comprises two end parts for housing the bearings 12; the end parts being rigidly connected together to form a rigid support for the spindle in a manner whereby the spindle between the bearings is exposed as is the drive to be described below. The housing 10 is mounted on a base frame 13 by means of a number of posts or reaction members 14, 15 and 16. There are four vertical reaction members 14 which serve to substantially prevent any vertical movement of the housing 10 relative to the frame 13 due to unbalance forces caused by rotation of the workpiece. The vertical members have a relatively thin section extending between the ends and thus facilitiate horizontal deflection of the housing 10 relative to the frame 13 when said unbalance forces occur. Movement of the housing 10 in a longitudinal direction, that is, in the direction of the spindle axis A-A relative to the frame 13 is prevented by longitudinal reaction member 15 which is located to the side of the housing between a flange 23 on the spindle housing and a flange 24 on the frame 13. Two horizontal reaction members are respectively arranged at opposite ends of t he housing 10 and each connects between a flange portion on the housing 10 and an upwardly extending side part 17 of base frame 13 via respective force transducers 18. The transducers 18 facilitate conversion of forces registered therein to electrical signals. Thus it will be evident that the arrangement of the spindle support enables out of balance forces in a rotating workpiece to be resolved into the horizontal direction of members 16 and measured by means of force transducers 18.

Before turning to describe drive means for rotating the spindle 11 it should be mentioned that in one conventional form such drive means comprise a pulley at the end of the spindle remote from the workpiece. The drive motor is conventionally situated away from the spindle support and is arranged in a manner such that the belt joining the motor pulley and the spindle pulley runs as near as possible at right angles to the plane along which the transducers are reacted, that is, the horizontal plane in which above described members 16 are located. Although with a theoretically perfect belt such an arrangement does not generate reactions in the transducers, with drives using practical belts (which are prone to unevenness and vibrations), practical pulley tolerances, and drives which are not 1:1 ratio and therefore have belt tensions inclined to the optimum right angle, interference from the driving belt cannot be avoided. Means other than belt drives such as gears cannot be used in practice at all with this conventional construction because there is no way of avoiding reactions in the direction of the transducers.

Returning now to the drawings the drive means is shown to comprise a worm gear 19 rigidly affixed to the spindle 11 by means (not shown). The worm gear 19 meshes with a worm drive 20 mounted on a horizontally extending shaft 25 supported in respective bearings 26 in the housing 10. The shaft 25 is rotatable by means of a driven pulley 21 to cause the worm drive 20 to rotate gear 19 and hence the spindle 11. A belt 22 is used to rotate driven pulley 21 from a drive motor (not shown). The drive motor has an output pulley (not shown) which is co-planar with the pulley 21 and the motor shaft (not shown) is in the same direction as shaft 25. The motor is mounted away from the housing 10, that is, it is mounted on a machine main frame (not shown) as is the base frame 13. In other words any out of balance forces caused by rotation of the motor are transmitted into the main frame and are thus not reacted into the transducers 18.

The motor output pulley, the driven pulley 21 and the belt 22 are located in a common vertical plane in which the reaction member 15 is also located. The location of reaction member 15 in the same plane as the pulleys and the drive belt is an optimum condition and is not essential for satisfactory operation of the apparatus. It will be appreciated that the plane of the belt 22 and its associated pulley is at right angles to the direction in which the out of balance forces are resolved, that is, the direction of reaction members 16. Thus any cyclical force changes occurring in the pulleys or belt are in a plane at right angles to the direction of resolution and thus should not cause any reaction in the transducers 18. In any case any spurious forces reacted into the transducers 18 from the belt or pulleys occur at a frequency substantially different to the frequency of forces to be measured and are thus easily isolated electrically. If the reaction member 15 is arranged for example directly below the axis A—A of the spindle the belt drive would cause a slight moment about the member 15 resulting in spurious forces being registered in the transducers but since such forces occur at a substantially different frequency to those being measured and since they are very slight due to the short moment arm they are easily isolated electrically. Thus in the embodiment described wherein the belt drive and drive pulleys are in a plane at right angles to the direction of resolution and the reaction member 15 is in the same plane, the criteria for optimum isolation are met.

Of course variations to the above described embodiment can be readily envisaged. For example, in another arrangement the shaft 25 for the worm drive 20 is vertically oriented and thus the pulleys and the belt drive are arranged in a horizontal plane. In this case the belt still extends in a direction at right angles to the direction of resolution of forces to be measured and the reaction member 15 may be located directly below the centre line of the belt to minimize any moments caused by the belt.

In another arrangement the input drive shaft is coaxial with the spindle axis A—A and is arranged at the other end of the spindle to the workpiece. The speed change is effected by means of a friction drive between the input shaft and spindle or could conceivably be a planetary or bevel gear arrangement. The motor shaft in this arrangement may be coaxial with the input shaft, and thus the spindle axis, or the motor may have its axis disposed at right angles to the spindle axis, that is, in the direction of resolution. In the latter case the motor could be mounted, for example, below the spindle and arranged to drive a pulley on the input shaft by means of a belt drive twisted to take account of the 90° change in direction.

It should be appreciated that speed changing means on the spindle or spindle housing may be means other than the worm drive. It is only essential that some speed changing means be arranged on the spindle or spindle housing so that any forces spuriously reacted into the housing from the drive arrangement occur at a frequency substantially different to the frequency of out of balance forces to be measured, and are sufficiently low in amplitude to avoid overloading of pre-amplifier or other signal conditioning means. Of course it is desirable that the drive be arranged such that the criteria for optimum isolation of spurious forces be met.

In a still further form of the invention the motor may be mounted directly on the spindle housing 10 with its axis arranged in the direction of resolution so as to provide optimum isolation of forces resulting from rotation of the motor. The motor would then drive speed changing means also mounted on the spindle housing 10. This arrangement is not particularly preferred in practice as the spindle support becomes unnecessarily cumbersome.

It will be seen that the invention is particularly advantageous in the case of balancing machines running at relatively low speeds. The high degree of effective vibration isolation provided by the invention facilitiates the construction of low speed balancing machines with their attendant advantages. One of these advantages is the reduction in drive motor size. With the motor mounted away from the spindle housing and because of the small size of the motor the whole assembly may be rotated enabling the spindle to be oriented in a vertical direction for easy mounting of the workpiece thereon and the assembly may then be rotated or pivoted to a horizontal position wherein the spindle is horizontally oriented for measuring and compensating for out of balance forces.

Although the invention has been described above in relation to cantilevered machine spindles, those skilled in the art will see its application possibilities in respect of other types of balancing machines of both the high and low tune varieties. Also, whilst the terms horizontal and vertical have been used in the above description it will be apparent that the apparatus may be oriented in any other suitable position.

I claim:

1. An apparatus for rotating a workpiece to be balanced in a balancing machine of the kind having a spindle for supporting said workpiece for rotation, said spindle being rotatably supported on a spindle mounting frame arranged to enable out of balance forces to be resolved into a single direction and measured, said single direction being at right angles to the axis of said spindle, wherein said apparatus comprises a speed reduction means mounted on said frame to transmit drive to said spindle, said speed reduction means rotating at a speed significantly greater than the rotational speed of said spindle and including an input shaft arranged at substantially a right angle to said spindle axis, said speed reduction means being driven by drive means from a drive motor mounted away from said frame, said drive motor having its shaft axis parallel to said input shaft such that any cyclical force changes occurring in said drive means and spuriously reacted into said direction occur at a frequency substantially different to the frequency of signals resulting from out of balance forces in said workpiece.

2. An apparatus as defined in claim 1 wherein said input shaft includes a worm drive and said spindle includes a worm gear, said drive means being a belt drive between a pulley on said input shaft and a pulley on said motor shaft.

3. An apparatus as defined in claim 2 wherein said spindle mounting frame is mounted on a main frame of said machine by means of reaction members which extend at right angles to said direction, said reaction members providing said resolution of forces into said direction, one said reaction member extending in the direction of said spindle axis and being arranged such that forces reacting along the plane of said drive means produce no reaction moment in said single direction.

4. An apparatus as defined in claim 3 wherein said one reaction member is arranged in the plane of said belt drive and said plane is normal to said single direction.

* * * * *